United States Patent [19]

Tharp

[11] Patent Number: 5,632,889
[45] Date of Patent: May 27, 1997

[54] FILTER CARTRIDGE FOR SEPARATING LIQUID HYDROCARBONS FROM WATER

[76] Inventor: Gary D. Tharp, 12250 San Antonio Rd., Atascadero, Calif. 93422

[21] Appl. No.: 488,931

[22] Filed: Jun. 9, 1995

[51] Int. Cl.[6] .................................................. C02F 1/28
[52] U.S. Cl. ...................... 210/165; 210/166; 210/170; 210/266; 210/282; 210/283; 210/474
[58] Field of Search ...................... 210/474, 266, 210/693, 163, 164, 263, 282, 120, 747, 165, 166, 283

[56] References Cited

U.S. PATENT DOCUMENTS

| | | | |
|---|---|---|---|
| 530,816 | 12/1894 | Wright | 210/164 |
| 540,940 | 6/1895 | Baughman | 210/282 |
| 1,532,013 | 3/1925 | Winans | 210/266 |
| 2,182,795 | 12/1939 | Day | 210/164 |
| 3,382,170 | 5/1968 | Pape | 210/691 |
| 3,424,676 | 1/1969 | Johnson et al. | 210/694 |
| 3,770,628 | 11/1973 | Yamamoto et al. | 210/694 |
| 3,855,132 | 12/1974 | Dugan | 210/455 |
| 4,261,823 | 4/1981 | Gallagher et al. | 210/164 |
| 4,589,798 | 5/1986 | Milly | 210/164 |
| 4,706,309 | 11/1987 | van den Brock | 210/169 |
| 4,935,132 | 6/1990 | Schaier | 210/163 |
| 5,215,657 | 6/1993 | Goldfield et al. | 210/321.64 |
| 5,264,134 | 11/1993 | McCamy | 210/679 |
| 5,284,580 | 2/1994 | Shyh | 210/163 |
| 5,297,367 | 3/1994 | Sainz | 210/307 |
| 5,322,629 | 6/1994 | Stewart | 210/767 |
| 5,364,535 | 11/1994 | Buckalew | 210/671 |
| 5,372,714 | 12/1994 | Logue, Jr. | 210/163 |
| 5,391,295 | 2/1995 | Wilcox et al. | 210/165 |
| 5,437,786 | 8/1995 | Horsley et al. | 210/170 |

FOREIGN PATENT DOCUMENTS

| | | | |
|---|---|---|---|
| 8901864 | 2/1991 | Netherlands | 210/164 |

*Primary Examiner*—Cynthia L. Nessler
*Attorney, Agent, or Firm*—Daniel C. McKown

[57] ABSTRACT

Perlite particles, after being expanded and treated with a silicone have the ability to selectively absorb hydrocarbons while rejecting water on or in which the hydrocarbons may be present. A carefully designed cartridge having an apertured top and an apertured bottom permits runoff water to percolate through a body of particulate perlite so that the desired separation can be accomplished. The cartridge in which the perlite is contained is easily removed from a catch basin when the perlite has become spent. The cartridge may then be opened and the spent perlite removed, after which the cartridge may be refilled with fresh perlite and replaced in the catch basin.

2 Claims, 3 Drawing Sheets

FILTER CARTRIDGE FOR SEPARATING LIQUID HYDROCARBONS FROM WATER

BACKGROUND OF THE INVENTION

1. Field of the Invention

The present invention is in the field of pollution control and specifically relates to a reusable cartridge for use in a storm drain to prevent liquid hydrocarbons from being carried by runoff water into sensitive waterways.

2. The Prior Art

In U.S. Pat. No. 3,382,170 Pape discloses a method of removing an oil film from a body of water by using expanded perlite that has been coated with a silicone for preferentially absorbing the oil and rejecting the water. Perlite is a generic term for a naturally occurring siliceous volcanic rock. Variations of Pape's disclosure are found in U.S. Pat. No. 3,674,683 to Ranier; U.S. Pat. No. 3,770,575 to Ball; U.S. Pat. No. 4,142,969 to Funk et al.; and, U.S. Pat. No. 5,302,590 to Newman.

Of course one cannot simply fill the storm drain with treated perlite; that would greatly reduce the capacity of the storm drain to handle heavy runoff. Also, after it has absorbed several times its own weight in hydrocarbons, the perlite becomes spent and needs to be replaced.

To avoid interfering with the flow of large amounts of water through the storm drain, a pending U.S. patent application of a different inventor discloses the use of an insert that fits into the mouth of a storm drain and that confines the perlite to a space immediately adjacent the vertical walls of the storm drain. In this arrangement, at low runoff rates the water will trickle through the perlite filter, but at greater runoff rates the water will simply cascade over the filter, bypassing it.

Although in theory the perlite could be disposed loosely in the insert, that approach is not practical for several reasons. Turbulence of the water would flush the perlite away unless the perlite were contained. However, if the perlite is contained loosely in the insert, removal of the spent perlite and its replacement by fresh perlite would become a problem. Further, the flow pattern of the incoming stream might be heavier in one region than in another, and this could cause displacement of the loose perlite and/or the production of rat holes to such an extent that the filtering action would be impaired.

The present inventor has solved all of these problems by providing a cartridge to confine the perlite within the insert, which cartridge is replaceable, refillable, and reusable.

SUMMARY OF THE INVENTION

It is a first objective of the present invention to provide a replaceable and reusable cartridge for holding a quantity of an absorbent particulate material. When the absorbent material has become spent, the cartridge can be removed from the insert, emptied and refilled with fresh absorbent material. The removability of the cartridge greatly facilitates refilling it.

It is a second objective of the present invention to provide a cartridge for holding the particulate absorbent material that will retain the material in a layer that is deep enough to provide adequate separation of the hydrocarbons from the water.

It is a third objective of the present invention to provide a cartridge having a lid that distributes the incoming liquid uniformly across and along the body of absorbent material.

It will be shown below that these objectives are met by the filter cartridge of the present invention.

In accordance with the present invention, the cartridge includes a unitary trough having a flat bottom and upwardly diverging walls and having horizontal flanges extending outwardly from the tops of the walls so that the trough can be supported on parallel spaced horizontal support surfaces provided by the insert.

In accordance with the present invention, there is provided a lid for the trough that includes a number of holes to distribute the incoming runoff water uniformly over the body of the particulate absorbent.

These and other features of the invention will be described below in connection with the description of a preferred embodiment of the invention. However, the following description is exemplary only and is not intended to limit the scope of the present invention.

DETAILED DESCRIPTION OF THE PREFERRED EMBODIMENT

Figure 1:
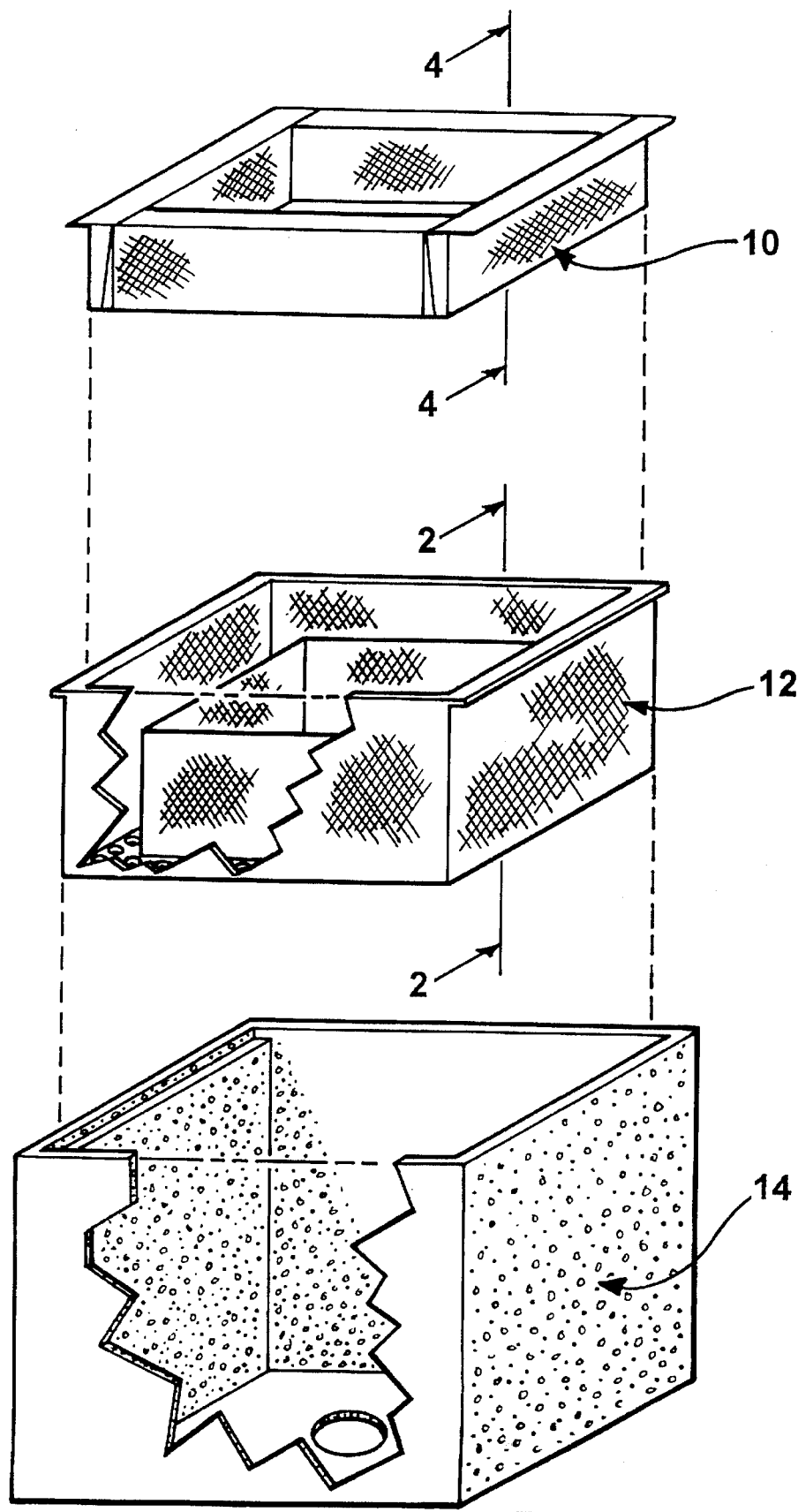
FIG. 1 is an exploded perspective view showing the storm drain and the insert with which the cartridges of the present invention are used.

As shown in FIG. 1, the cartridge 10 of the present invention is one of four that are removably mounted in a plastic insert 12 that is installed in a concrete catch basin 14.

Figure 2:
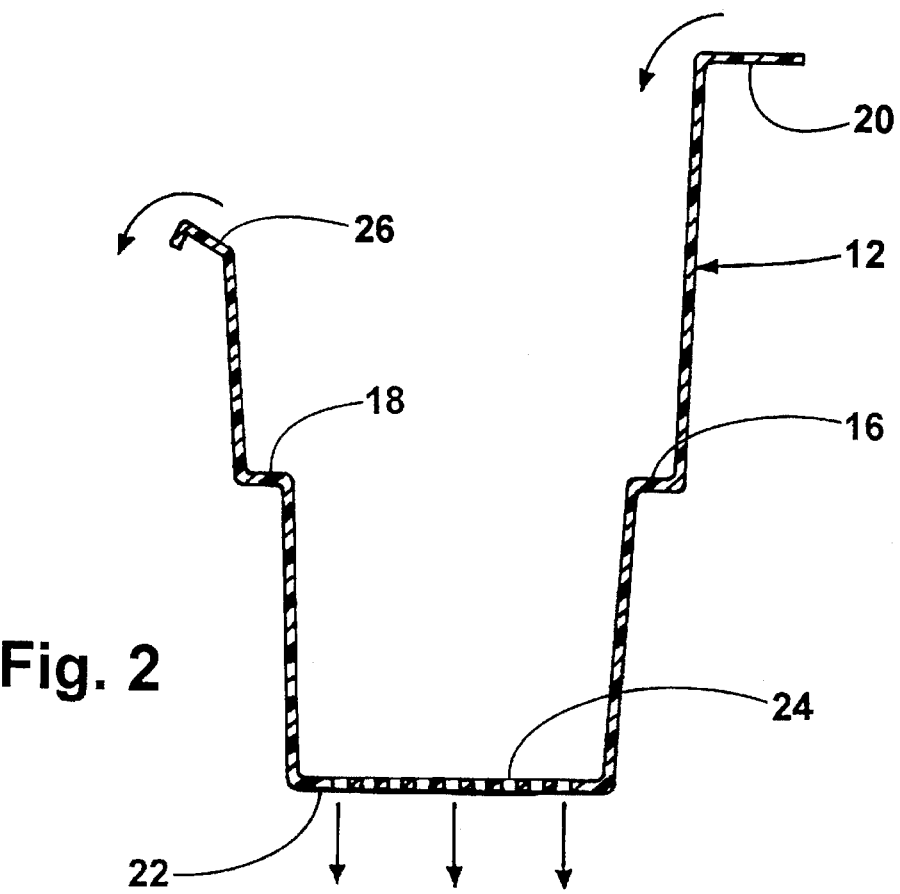
FIG. 2 is a side elevational view in cross section of the insert, viewed in the direction 2—2 indicated in FIG. 1.
Figure 3:
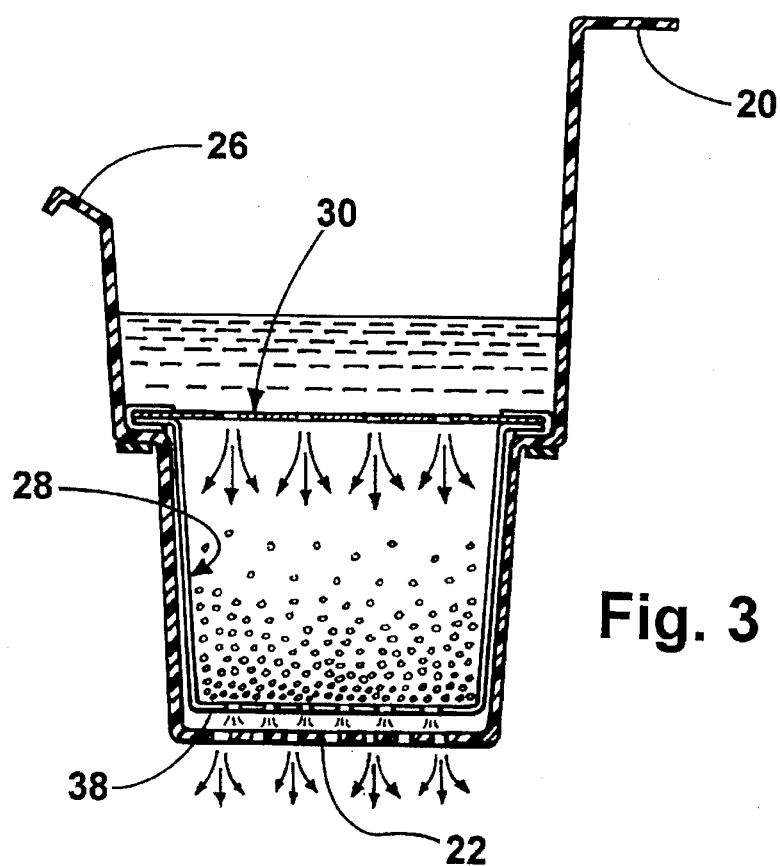
FIG. 3 is a side elevational view in cross section showing the cartridge of the present invention installed within the insert of FIG. 2.

As best seen in FIGS. 2 and 3, the insert 12 includes a pair of parallel spaced horizontal support surfaces 16 and 18 which are provided for the purpose of supporting the cartridge of the present invention.

As shown in FIG. 2, the insert 12 also includes a horizontal flange 20 upon which the insert rests, and a bottom 22 that is provided with holes of which the hole 24 is typical.

The incoming liquid, which typically consists of runoff water on which a film of a liquid hydrocarbon floats, flows into the insert 12 over the horizontal flange 20. At low flow rates, all of the incoming water passes through the cartridge 10 which separates and retains the hydrocarbon component from the liquid, and the aqueous component drains out through the holes in the bottom of the insert.

As the flow rates increases, the level of the water in the insert rises until the excess liquid is discharged over the weir 26. At this higher flow rate, the cartridge 10 remains in operation and in fact operates at its greatest possible throughput, but in the case of a heavy runoff, the maximum throughput of the cartridge will be exceeded, and the excess liquid will be discharged without the benefit of filtration by the cartridge. This is not a serious problem, because most of the hydrocarbon components will have been flushed away before the runoff becomes heavy.

Figure 4:
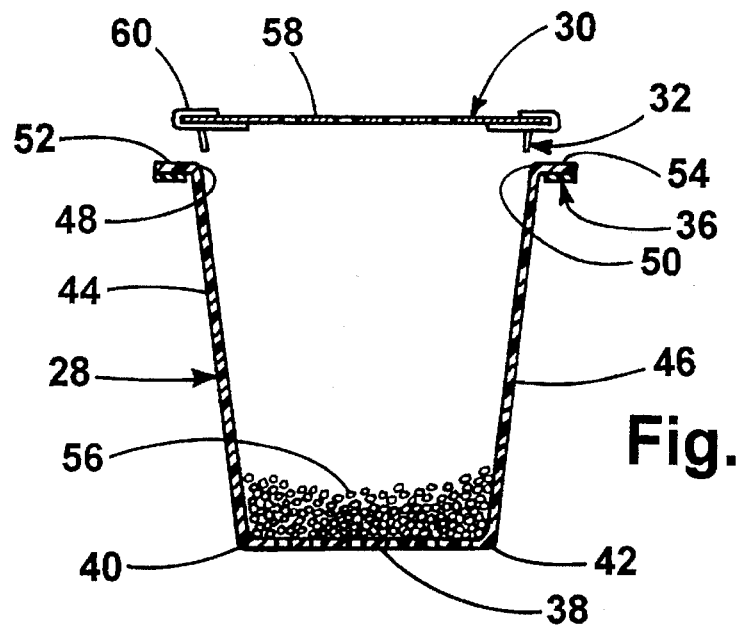
FIG. 4 is a cross sectional view of the cartridge and lid viewed in the direction 4—4 indicated in FIG. 1.

FIG. 4 shows a cross section of the cartridge in a preferred embodiment of the present invention viewed in the direction of 4—4 indicated in FIG. 1.

Figure 5:
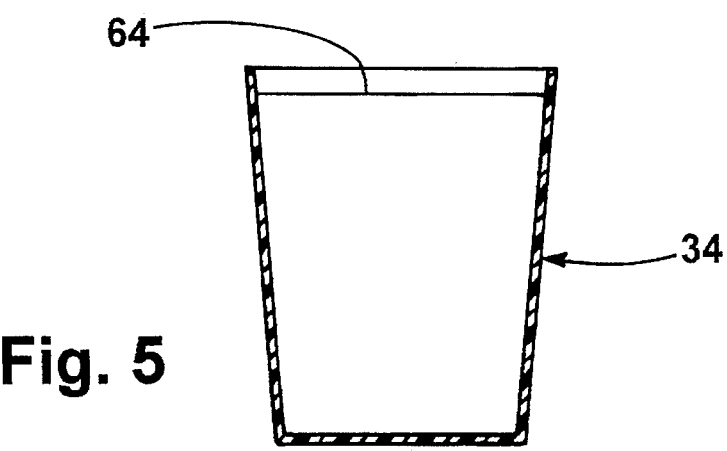
FIG. 5 is a side elevational view of an end wall of the cartridge.
Figure 6:
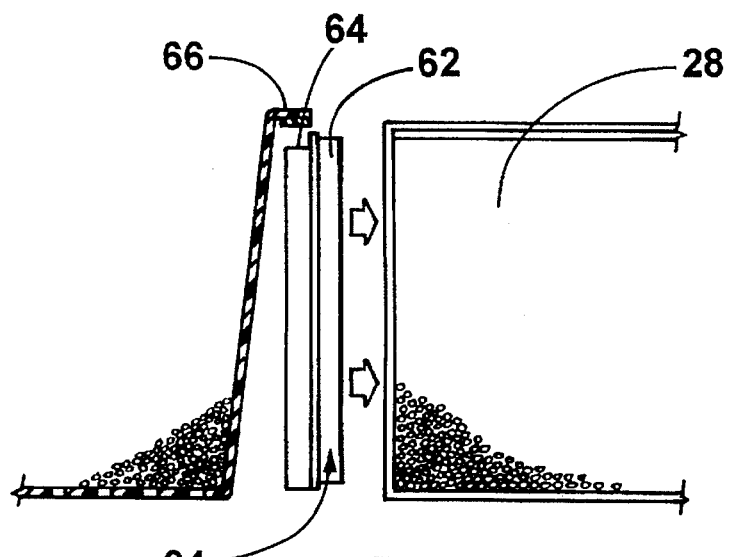
FIG. 6 is a side elevational view of the cartridge of the present invention showing how the end wall is joined to the trough portion.

In the preferred embodiment, the cartridge includes a trough 28, a lid 30, a spring clip 32 for securing the lid to the trough, two end walls like the end wall 34 shown in FIGS. 5 and 6, and a sealing gasket 36.

As seen in FIG. 4, the trough 28 includes a flat bottom 38, in the preferred embodiment, which is apertured to permit the outward flow of water that has passed through the absorbent material 56. The apertures must be small enough to keep the absorbent material from washing out through them, and the number of apertures must be great enough to pass the largest flow expected. From the opposite edges 40 and 42 of the bottom 38, sides 44 and 46 diverge upwardly to parallel upper edges 48 and 50 respectively. Flanges 52 and 54 extend horizontally and outwardly from the flanges 48 and 50 respectively. The horizontal spacing between the flanges 52 and 54 is equal to the spacing between the support surfaces 16 and 18 of FIG. 2 which are used for supporting the trough 28 within the insert 12. A sealing gasket 36 prevents water from bypassing the trough. The lid 30 includes an apertured flat central portion 58 and a wrap-around frame 60.

As best seen in FIGS. 5 and 6, the end wall 34 includes a plug portion 62 that is inserted into the open end of the trough 28. The end wall also includes an outwardly projecting support surface 64 on which one of the flanges 66 of an adjacent trough is supported. In this manner, the integrity of the seal is maintained even at the corners where adjacent troughs meet.

When the absorbent material 56 has become spent, the trough and its lid may be lifted from the insert 12 and a replacement cartridge can then be lowered into the same position. The spent cartridge may be refilled at the site, or it may be transported to a central facility at which the spent material is disposed of and the cartridge is refilled with fresh absorbent material.

In a preferred embodiment, the trough 28 and the lid 30 are formed of a plastic material such as polypropylene. As suggested by FIG. 1, two sizes of cartridge are used in a typical installation. In the preferred embodiment, the shorter cartridges are 18 inches long and the longer cartridges are 24 inches long.

Thus, there has been described a removable, refillable, and replaceable cartridge for use in catch basins to remove liquid hydrocarbons from runoff water. The installation of the cartridge system does not interfere with the normal operation of the catch basin, but has the potential of preventing the hydrocarbon pollution from reaching sensitive waterways.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Apparatus for installation in a hollow catch basin for separating liquid hydrocarbons from water flowing into the catch basin, the catch basin having an upper edge over which the water falls and having a substantially vertical wall extending downward from the upper edge of said catch basin, said apparatus comprising:

an insert extending down into and around the inner periphery of said hollow catch basin, said insert having a central hollow conduit, a bottom portion, an outer wall, an inner wall spaced from said outer wall, and a trough disposed in said bottom portion of said insert between said inner and said outer walls so that water falling from the upper edge of the catch basin will fall into said trough, said outer wall having an outwardly directed flange resting on the upper edge of said catch basin for supporting said insert, said outer wall of said insert extending downward along the wall of said catch basin, said inner wall surrounding said central hollow conduit and having an upper edge disposed at a height lower than said outwardly directed flange of said outer wall, said upper edge of said inner wall defining a weir, said trough including a lower portion having perforations to permit water to drain from the trough; and a cartridge telescopically received within and extending along the lower portion of the trough of said insert, said cartridge including a perforated bottom to permit water to drain from said cartridge and having a perforated lid for distributing incident water substantially uniformly over the lid, said cartridge further including an absorbent particulate material contained therein, said absorbent particulate material defining means for absorbing liquid hydrocarbons.

2. The apparatus of claim 1 wherein the absorbent particulate material is expanded perlite coated with a silicone.

* * * * *